United States Patent
Kim et al.

(10) Patent No.: US 7,652,609 B2
(45) Date of Patent: Jan. 26, 2010

(54) APPARATUS AND METHOD FOR DETECTING MOTION WITH LOW POWER CONSUMPTION IN INERTIA SENSOR

(75) Inventors: Youn Ho Kim, Hwaseong-si (KR); Kun Soo Shin, Seongnam-si (KR); Hyun Tai Hwang, Yongin-si (KR); Jong Pal Kim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 682 days.

(21) Appl. No.: 11/401,942

(22) Filed: Apr. 12, 2006

(65) Prior Publication Data
US 2007/0024581 A1 Feb. 1, 2007

(30) Foreign Application Priority Data
Aug. 1, 2005 (KR) .................. 10-2005-0070411
Sep. 15, 2005 (KR) .................. 10-2005-0086120

(51) Int. Cl.
*H03M 1/12* (2006.01)

(52) U.S. Cl. ..................................................... 341/155
(58) Field of Classification Search ................. 341/155, 341/13, 5; 702/141, 193; 324/162
See application file for complete search history.

(56) References Cited

U.S. PATENT DOCUMENTS

| | | | | |
|---|---|---|---|---|
| 5,659,316 | A * | 8/1997 | Stierli | 341/143 |
| 7,215,111 | B2 * | 5/2007 | Kaneyasu et al. | 324/174 |
| 7,216,053 | B2 * | 5/2007 | Rakkola et al. | 702/141 |

* cited by examiner

*Primary Examiner*—Brian Young
(74) *Attorney, Agent, or Firm*—Staas & Halsey LLP

(57) ABSTRACT

A motion detector and method with low power consumption in an inertia sensor. The motion detector is selectively supplied with power for operation of the inertia sensor according to a power control signal. While the inertia sensor is supplied with power, three-dimensional analog signals are sampled, A/D converted, and outputted via a controller. A pulse width of the power control signal is determined by reflecting the sampling and A/D conversion period and reflecting the operation preparing period of the inertia sensor from the A/D converted value.

31 Claims, 8 Drawing Sheets

APPARATUS AND METHOD FOR DETECTING MOTION WITH LOW POWER CONSUMPTION IN INERTIA SENSOR

CROSS-REFERENCE TO RELATED APPLICATIONS

This application claims the benefit of Korean Patent Application Nos. 10-2005-70411, filed on Aug. 1, 2005, and 10-2005-86120, filed on Sep. 15, 2005, in the Korean Intellectual Property Office, the disclosures of which are incorporated herein by reference.

BACKGROUND OF THE INVENTION

1. Field of the Invention

The present invention relates to a motion detector, and more particularly, to a motion detecting apparatus and method which periodically controls power supplied to an inertia sensor to reduce power consumption.

2. Description of Related Art

A system for detecting motion of an object includes an inertia sensor. The inertia sensor includes an accelerometer, a gyro sensor, or a geomagnetic compass sensor.

The inertia sensor described above has been widely used in navigation control systems such as automobiles, trains, ships, airplanes, and the like, or in automatic control systems such as factory automation equipment and robots. Also, the inertia sensor is being used in portable systems such as pedometers, cellular phones, and the like. In this instance, the inertia sensor is used to detect a vibration, an external impact, the movement of an object and the like.

For example, an inertia sensor may output a certain acceleration value according to a user's motion and measure a number of steps the user takes as a function of a pedometer. Also, an inertia sensor may be used to determine whether a cellular phone is in a sleep mode or in an operation mode. When the motion of a cellular phone is less than a certain level, the cellular phone goes into a standby mode. Namely, the cellular phone operates in a sleep mode so as to avoid the use of unnecessary power.

An inertia sensor generally detects three-dimensional information associated with inertia by using a circuit. In this case, the circuit operates according to the principle of inertia, gyroscopic principle and the like. However, an inertia sensor is generally supplied with direct current power and operates. Accordingly, in this instance, the inertia sensor consumes a lot of power.

BRIEF SUMMARY

An aspect of the present invention provides a motion detector which can detect information associated with inertia using only a minimal amount of power needed for an inertia sensor so that power consumption is reduced.

An aspect of the present invention also provides a method which can determine a power control signal of an inertia sensor and detect information associated with inertia from the inertia sensor according to the power control signal.

According to an aspect of the present invention, there is provided a motion detector including: an inertia sensor supplied with power and generating an analog signal associated with inertia, the power selectively supplied or shut off according to a power control signal; and a controller generating the power control signal, sampling the analog signal associated with inertia, and converting the same into a digital value, wherein a pulse width of the power control signal is determined by reflecting a sampling and digital conversion period and reflecting an operation preparing period of the inertia sensor based on the converted digital value.

The analog signal associated with inertia may be an analog acceleration signal. In this instance, the controller samples the analog acceleration signal and converts the same into a corresponding digital acceleration value within a pulse width of the power control signal for which the power is supplied to the inertia sensor, and the pulse width of the power control signal is determined on the basis of digital acceleration values in a motion state and digital acceleration values in a static state where the analog acceleration signal is converted by the controller.

Also, the controller may measure the difference between an operation starting time of the inertia sensor when power is initially supplied according to the power control signal and a normal operation time of the inertia sensor, as the operation preparing period, and reflect the measured difference to determine the pulse width of the power control signal.

According to another aspect of the present invention, there is provided a motion detecting method including: generating a power control signal; selectively supplying or shutting off power to an inertia sensor according to the power control signal; generating an analog signal associated with inertia via the inertia sensor; and sampling the analog signal and converting the same into a digital value, wherein a pulse width of the power control signal is determined by reflecting a sampling and digital conversion period and reflecting an operation preparing period of the inertia sensor based on the converted digital value.

According to another aspect of the present invention, there is provided a computer-readable storage medium encoded with processing instructions for causing a processor to execute the aforementioned method.

Additional and/or other aspects and advantages of the present invention will be set forth in part in the description which follows and, in part, will be obvious from the description, or may be learned by practice of the invention.

BRIEF DESCRIPTION OF THE DRAWINGS

The above and/or other aspects and advantages of the present invention will become apparent and more readily appreciated from the following detailed description, taken in conjunction with the accompanying drawings of which.

DETAILED DESCRIPTION OF EMBODIMENTS

Reference will now be made in detail to embodiments of the present invention, examples of which are illustrated in the accompanying drawings, wherein like reference numerals refer to the like elements throughout. The embodiments are described below in order to explain the present invention by referring to the figures.

Figure 1:
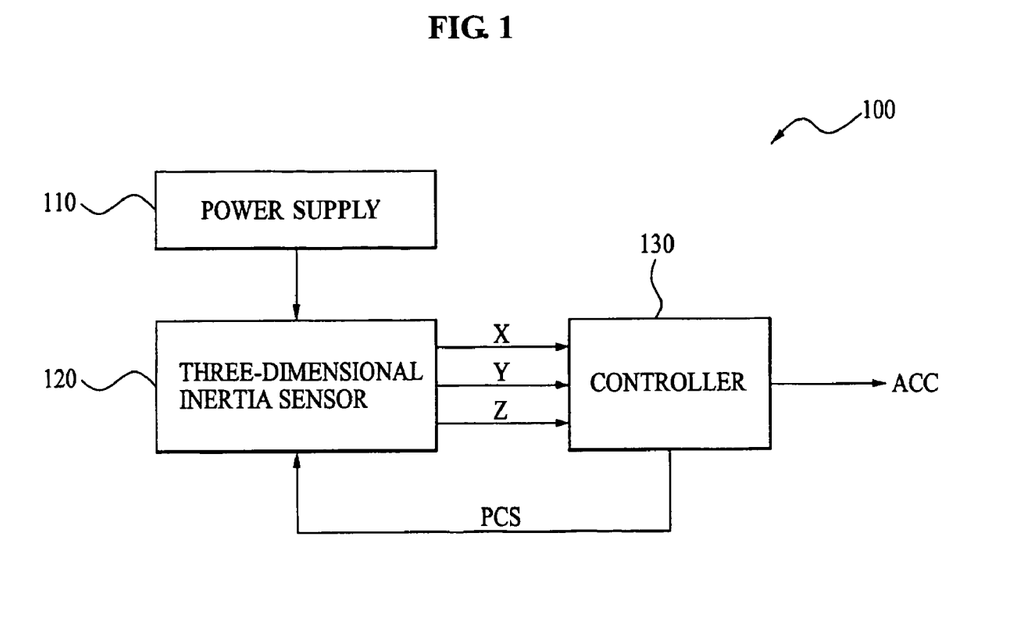
FIG. 1 is a block diagram of a motion detector according to an embodiment of the present invention.

FIG. 1 is a block diagram of a motion detector 100 according to an embodiment of the present invention. Referring to FIG. 1, the motion detector 100 includes a power supply 110, a three-dimensional inertia sensor 120, and a controller 130.

The three-dimensional inertia sensor 120 generates three-dimensional analog signals associated with inertia, such as X, Y, and Z. The three-dimensional inertia sensor 120 may be an accelerometer, a gyro sensor, a geomagnetic compass sensor, or the like. Also, the three-dimensional inertia sensor 120 may generate analog signals indicating acceleration associated with inertia of an object, angular velocity, yaw angle, and the like.

The motion detector 100 includes the three-dimensional inertia sensor 120. The motion detector 100 may be provided in a transportation system, automation equipment, or a portable system. Also, the motion detector 100 generates a certain digital value such as an acceleration value (ACC) associated with inertia according to the motion of the device which is provided with the motion detector 100. The digital value associated with inertia may be transmitted to a subsequent processor (not illustrated) via a serial bus, Bluetooth or the like. The subsequent processor interprets the degree of the motion of the device which is provided with the motion detector 100 according to the digital value associated with inertia and performs a certain function such as a selection of an operation mode, a sleep mode, and the like.

Figure 2:
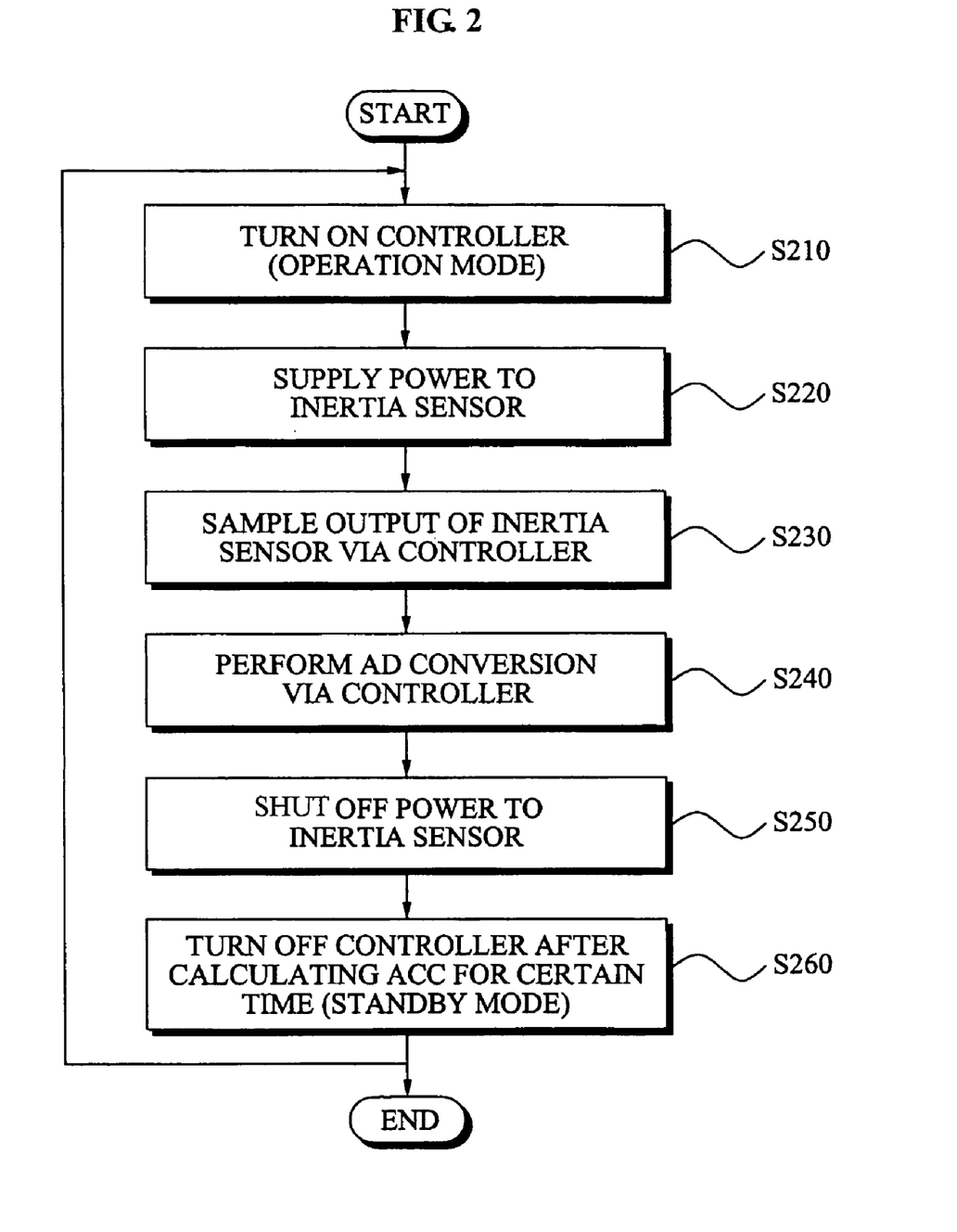
FIG. 2 is a flowchart illustrating operations of the motion detector of FIG. 1.

To more easily explain operations of the motion detector 100 of FIG. 1, the flowchart of FIG. 2 will be referred to. In this instance, it is assumed that the three-dimensional inertia sensor 120 is an accelerometer generating an analog acceleration signal and the controller 130 generates a digital acceleration value ACC. However, it is to be understood that other configurations of the inertia sensor are contemplated.

Referring to FIG. 2, in S210, the controller 130 is turned on to operate. When the controller 130 is turned on, a power control signal (PCS) becomes a high logic state after a certain time. Accordingly, in S220, the three-dimensional inertia sensor 120 is supplied with power from the power supply 110. A current source, a voltage source, and the like may be variously used for the power supply 110. The PCS is generated from the controller 130. A pulse width of the PCS is determined on the basis of the digital acceleration value ACC in a static state of the three-dimensional inertia sensor 120 and the digital acceleration value ACC in a motion state thereof. Later, a method of determining the pulse width of the PCS will be described in further detail with reference to FIGS. 4 through 9.

When the three-dimensional inertia sensor 120 is supplied with power from the power supply 110, the three-dimensional inertia sensor 120 three-dimensionally generates analog acceleration signals with respect to three directions. That is, the three-dimensional inertia sensor 120 generates acceleration signal X in a first direction, acceleration signal Y in a second direction, and acceleration signal Z in a third direction. The three directions indicate directions in rectangular coordinates representing a three-dimensional space.

Figure 3:
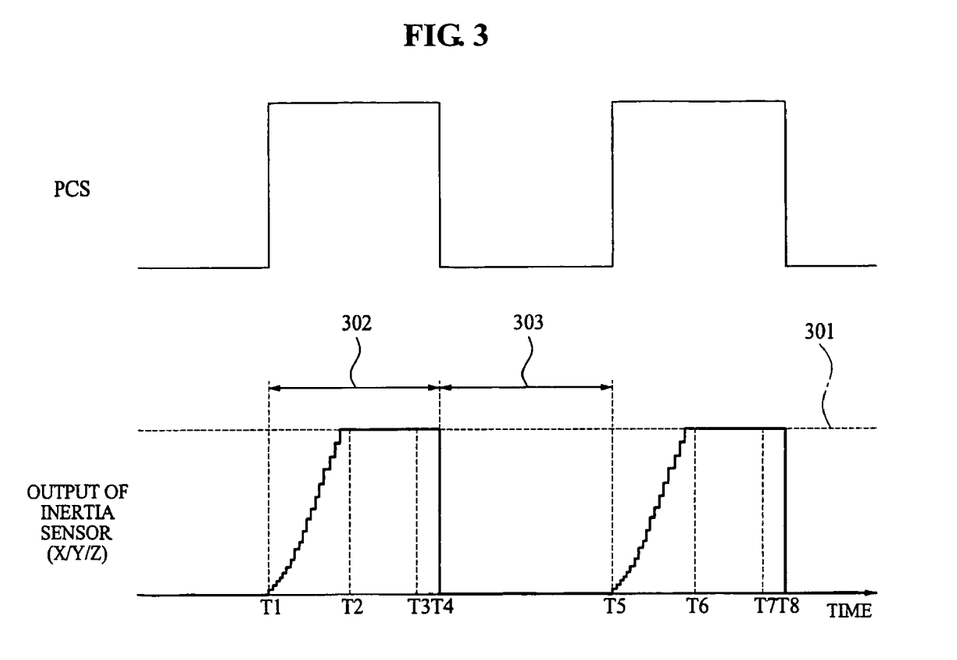
FIG. 3 is a diagram illustrating waveforms of outputs of an inertia sensor in the case of constantly supplying power and in the case of using power control signals.

FIG. 3 illustrates the PCS and any one waveform of analog acceleration signals X, Y, and Z generated from the three-dimensional inertia sensor 120. When power is constantly supplied to the three-dimensional inertia sensor 120, analog acceleration signal X, Y, or Z may be consecutively outputted as shown in 301. However, in the present embodiment, power is selectively supplied or shut off to the three-dimensional inertia sensor 120 according to a logic state of the PCS. Accordingly, output of the three-dimensional inertia sensor 120 such as X, Y, or, Z may have an irregular shape. In this case, the PCS controls the supply of power to the three-dimensional inertia sensor 120. Also, the PCS is a signal having different logic levels according to a period of supplying power to the three-dimensional inertia sensor 120 as show in 302 of FIG. 3 and a period of shutting off power thereto as shown in 303 of FIG. 3. That is, while the three-dimensional inertia sensor 120 is supplied with power for the period 302, the three-dimensional inertia sensor 120 generates analog acceleration signals X, Y, and Z according to motion. However, the three-dimensional inertia sensor 120 does not operate for the period 303. Accordingly, since power is periodically supplied and shut off, it is possible to save power consumed by the three-dimensional inertia sensor 120 while the power is shut off.

As described above, while the three-dimensional inertia sensor 120 is supplied with power from the power supply 110 to operate, that is, in a logical high pulse period of the PCS, the controller 130 samples the analog acceleration signals X, Y, and Z generated from the three-dimensional inertia sensor 120 in S230. In this case, the sampling frequency is dependent upon specifications for each installed system. For example, an acceleration signal from an acceleration sensor of "Kionix" may be sampled at 80 Hz. In this instance, Kionix may be provided in a cellular phone or the like.

For example, an operation of the controller 130 sampling the analog acceleration signals X, Y, and Z is repeated per certain sampling period as shown in a period between T2 and T3, a period between T6 and T7, and the like, in FIG. 3. In S240, the controller 130 performs analog-to-digital (A/D) conversion with respect to the sampled signals.

An initial operation preparing period of the three-dimensional inertia sensor 120 such as a period between T1 and T2, a period between T5 and T6, and the like, is needed to make the controller 130 perform reliable sampling and A/D conversion. As illustrated in FIG. 3, the three-dimensional inertia sensor 120 is supplied with the power from the power supply 110 and starts initializing in T1, T5, etc. which is a certain period before T3, T7, etc. In this case, T3 and T7 is a point in time when the controller 130 completes sampling and A/D conversion. Accordingly, the controller 130 performs sampling after T2, T6, etc. which is a point in time when the operation preparation of the three-dimensional inertia sensor 120 is completed. In FIG. 3, T3 and T7 is a point in time when the controller 130 completes sampling of an output of the three-dimensional inertia sensor 120 such as X, Y, or Z. Even after T3, T7, etc., sufficient marginal period such as a period between T3 and T4 and a period between T7 and T8 is provided for stabilized and reliable A/D conversion of an A/D converter (not illustrated) provided in the controller 130.

After the controller 130 performs the A/D conversion, the controller 130 outputs the PCS in a low logic state at a point in time such as T4, T8, etc. The power supply is shut off to the three-dimensional inertia sensor 120 from the power supply 110 in S250. The power supply to the three-dimensional inertia sensor 120 may be shut off immediately after the controller 130 completes sampling. That is, although there is a certain marginal period between T3 and T4, this period is relatively shorter. Accordingly, sampling of the controller 130 and power shut off to the inertia sensor 120 is performed at substantially the same time.

After completing the A/D conversion, the controller 130 generates a corresponding digital acceleration value ACC according to predetermined algorithms on the basis of the A/D converted values in S260 of FIG. 2. The algorithms as above may be consecutively performed even in a period for which the power supply to the three-dimensional inertia sensor 120 is shut off. In the algorithm performance of the controller 120, a current acceleration value is tracked from A/D converted values of analog acceleration signals X, Y, and Z from the three-dimensional inertia sensor 120. For example, when the A/D converted values have 12 bits and have values of 0 to 4095 in decimal, an acceleration value ACC may be determined as equation 1. When an A/D converted value is 2048 in equation 1, a digital acceleration value ACC indicates 0.0 g. In this instance, g is acceleration of gravity.

$$ACC = (A/D\ \text{converted value} - 2048)/274$$

As described above, the controller 130 may separately interpret the degree of acceleration according to equation 1 with respect to A/D converted values of analog acceleration signals X, Y, and Z of the three-dimensional inertia sensor 120 in three directions such as X, Y, and Z, and generate a corresponding digital acceleration value ACC. Also, the controller 130 may generate each A/D converted value of the analog acceleration signals X, Y, and Z as a corresponding digital acceleration value ACC. Also, the controller 130 may generate a corresponding digital acceleration value ACC indicating the degree of motion of the three-dimensional inertia sensor 120 by a method of averaging or adding weight to and averaging acceleration values in the three directions of X, Y, and Z.

In S260 of FIG. 2, the controller 130 is turned off after generating the digital acceleration value ACC, and operates in standby mode. This also reduces the power consumption of the controller 130. That is, before changing into an operation mode, the controller 130 operates in a standby mode for a certain period before the three-dimensional inertia sensor 120 is supplied with power. In this instance, the operation mode is for supplying power to the three-dimensional inertia sensor 120 according to the PCS. Conversion between the operation mode and the standby mode of the controller 130 repeats during each period of the PCS.

Hereinafter, a method of determining the pulse width of the PCS will be described in detail. In the present embodiment, the pulse width of the PCS, that is, a high logic state has to be determined properly so that the three-dimensional inertia sensor 120 is selectively supplied with power from the power supply 110 according to the PCS and operates reliably. As described above, the three-dimensional inertia sensor 120 starts operating in a point in time such as T1, T5, etc. when the PCS is triggered to a high logic state. In this instance, the three-dimensional inertia sensor 120 stops operating in a point in time T4, T8, etc. when the PCS is triggered to a low logic state after sampling and A/D conversion by the controller 130 is completed within a certain period.

Figure 4:
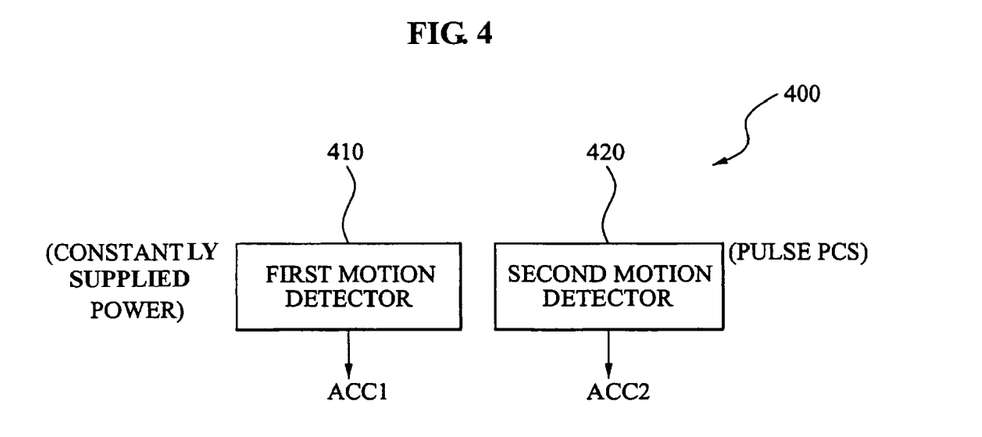
FIG. 4 is a diagram explaining a method of determining the pulse width of a power control signal in a static state according to an embodiment of the present invention.

FIG. 4 is a diagram explaining a method of determining the pulse width of a PCS in a static state according to an embodiment of the present embodiment. A measuring system 400 in the static state includes a first motion detector 410 and a second motion detector 420. The first motion detector 410 is constantly supplied with power. The second motion detector 420 is driven by the PCS described in FIG. 1 and is selectively shut off or supplied with power by the PCS. The first motion detector 410 operates similarly to the second motion detector 420 except for the fact that power is constantly supplied. In this instance, it is assumed that the first motion detector 410 and the second motion detector 420 has a corresponding accelerometer as the three-dimensional inertia sensor 120 and generates a first digital acceleration value ACC1 and a second digital acceleration value ACC2 in the static state.

Figure 5A:
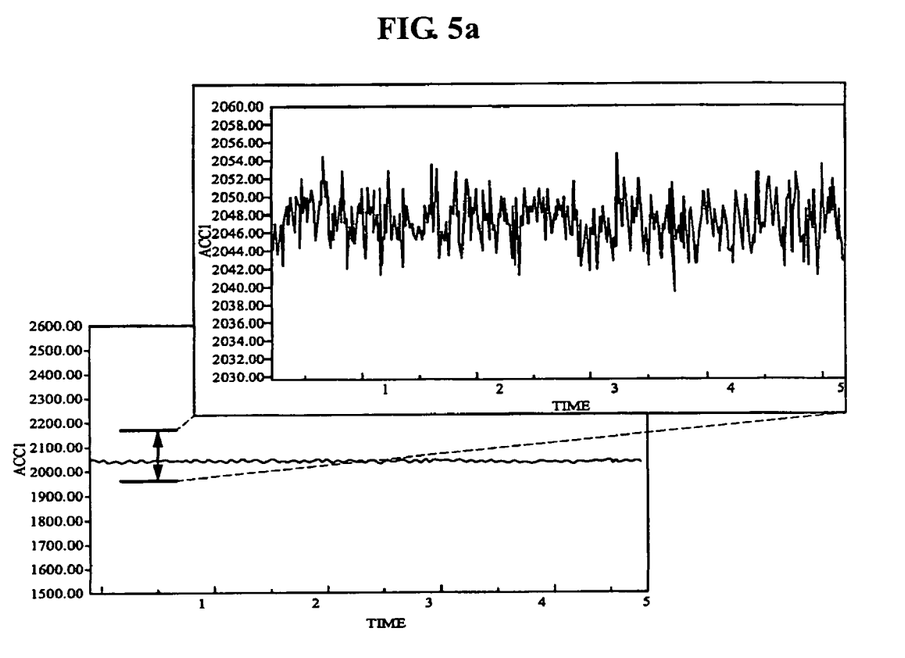
FIG. 5a is a diagram illustrating waveforms of outputs of a first motion detector of FIG. 4.
Figure 5B:
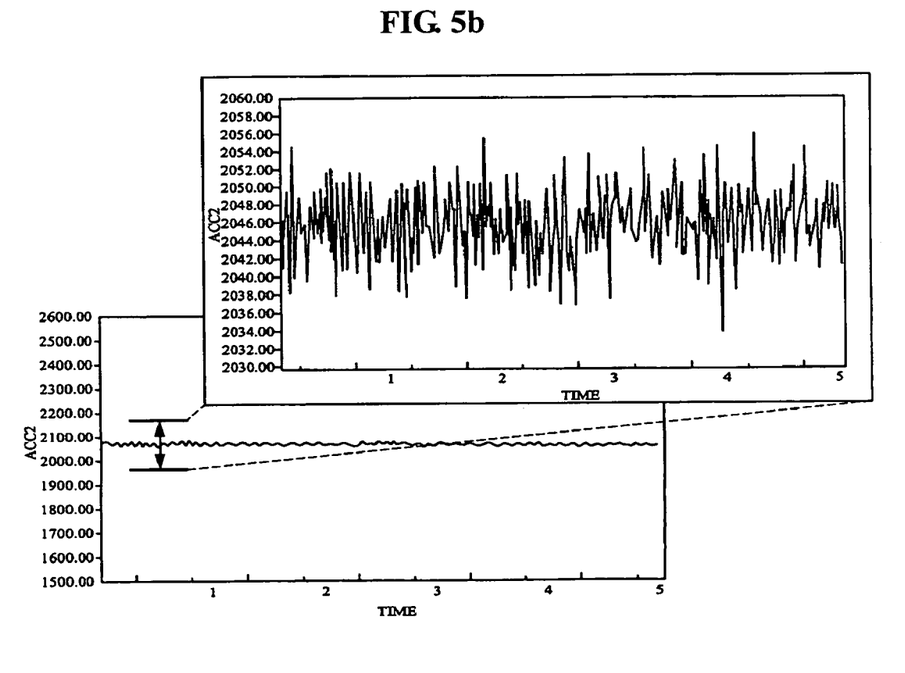
FIG. 5b is a diagram illustrating waveforms of outputs of a second motion detector of FIG. 4.

FIGS. 5a and 5b illustrate waveforms of an output of the first motion detector 410 ACC1 and an output of the second motion detector 420 ACC2 as A/D converted values with respect to time.

In a static state, the output of the first motion detector 410 ACC1 and output of the second motion detector 420 ACC2 minutely fluctuate around acceleration 0.0 g, for example, A/D converted value 2048. The first motion detector 410 is constantly supplied with power and operates. However, an output of the first motion detector 410 ACC1 is not at a constant 0.0 g because of minute fluctuation caused by noise present in a static state. Noise level of an output of the second motion detector 420 ACC2 in a static state is tested to adjust the noise level of the second motion detector 420 to be similar to the noise level of the output of the first motion detector 410 ACC1 as described above.

Fluctuation of an output of the second motion detector 420 ACC2 in a static state may be different according to an operation preparing period of the three-dimensional inertia sensor 120 such as a period between T1 and T2 in FIG. 3. The operation preparing period is one part of the pulse width of the PCS. For example, when the three-dimensional inertia sensor 120 included in the second motion detector 420 is stabilized for a long enough time from T1, which is a point in time when the PCS is triggered to a high logic state, fluctuation of outputs of the second motion detector 420 ACC2 becomes smaller and may be shown as a small level almost the same as an output of the first motion detector 410 ACC1.

Figure 6:
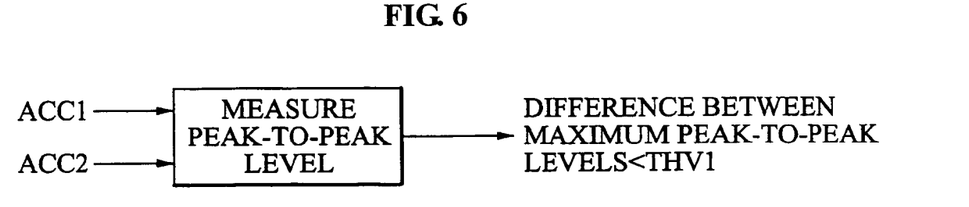
FIG. 6 is a diagram explaining a method of determining an operation preparing period of the inertia sensor of FIG. 1 in a static state by a system of FIG. 4.

To determine an operation preparing period of the three-dimensional inertia sensor 120 of FIG. 1 such as a period between T1 and T2 as shown in FIG. 3, peak-to-peak levels of an output of the first motion detector 410 ACC1 and an output of the second motion detector 420 ACC2 is compared as shown in FIG. 6. That is, the maximum peak-to-peak level of an output of the first motion detector 410 ACC1 and the maximum peak-to-peak level of an output of the second motion detector 420 ACC2 measured for a certain period is compared. The operation preparing period of the three-dimensional inertia sensor 120 is adjusted to make the difference therebetween smaller than a threshold value THV1. In this case, the threshold value THV1 may be smaller than 0.05 g.

Figure 7:
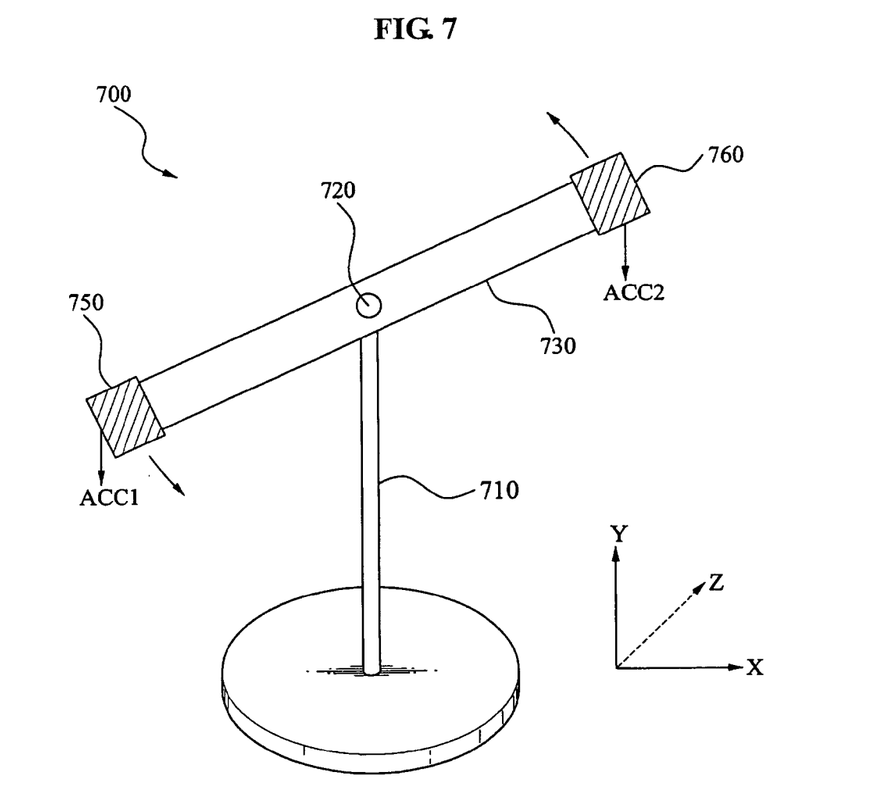
FIG. 7 is a diagram explaining a method of determining the pulse width of a power control signal in a motion state according to an embodiment of the present invention.

FIG. 7 is a diagram explaining a method of determining the pulse width of a PCS in a motion state according to an embodiment of the present embodiment. A test in a motion state may be performed via an arbitrary vibrating device such as a hand. Also, as illustrated in FIG. 7, the test may be performed in a rotating device 710 including a rotation bar 730 provided to rotate on a rotation axis 720. Referring to FIG. 7, a measuring system 700 in the motion state has a first motion detector 750 and a second motion detector 760 on opposite ends of the rotation bar 730. In this case, it is assumed that the test is performed to two-dimensionally rotate on an X-Y plane. However, the test may be performed to two-dimensionally rotate on an X-Z or a Y-Z plane.

The first motion detector 750 is constantly supplied with power and operates continuously. The second motion detector 760 has a controlled power supply which is shut off according to the PCS and operates only when power is supplied. Except for the fact that the first motion detector 750 is constantly supplied with power, the first motion detector 750 operates similarly to the second motion detector 760. Even in this case, it is assumed that the first motion detector 750 and the second motion detector 760 has its corresponding accelerometer as the three-dimensional inertia sensor 120, and generates a first digital acceleration value ACC1 and a second digital acceleration value ACC2, in a condition where the rotation bar 730 is rotating.

Figure 8A:
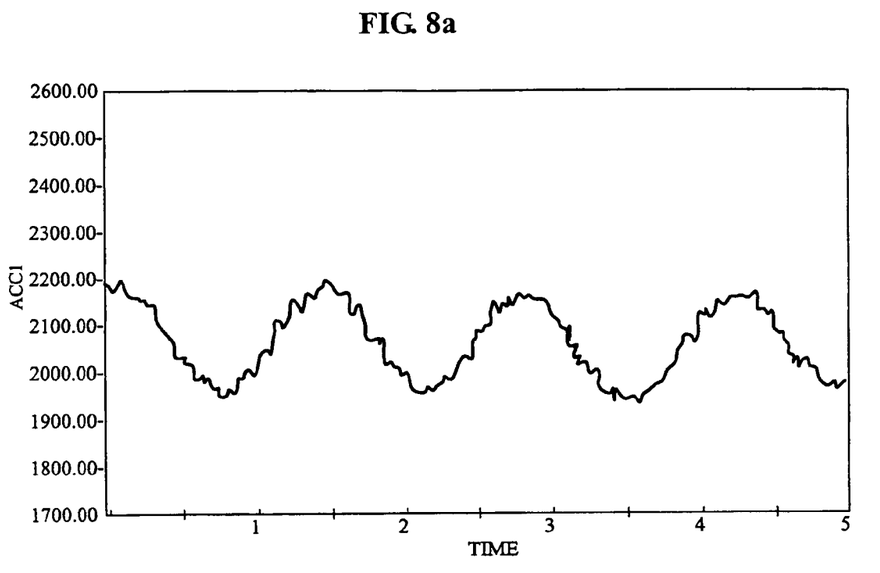
FIG. 8a is a diagram illustrating waveforms of outputs of a first motion detector of FIG. 7.
Figure 8B:
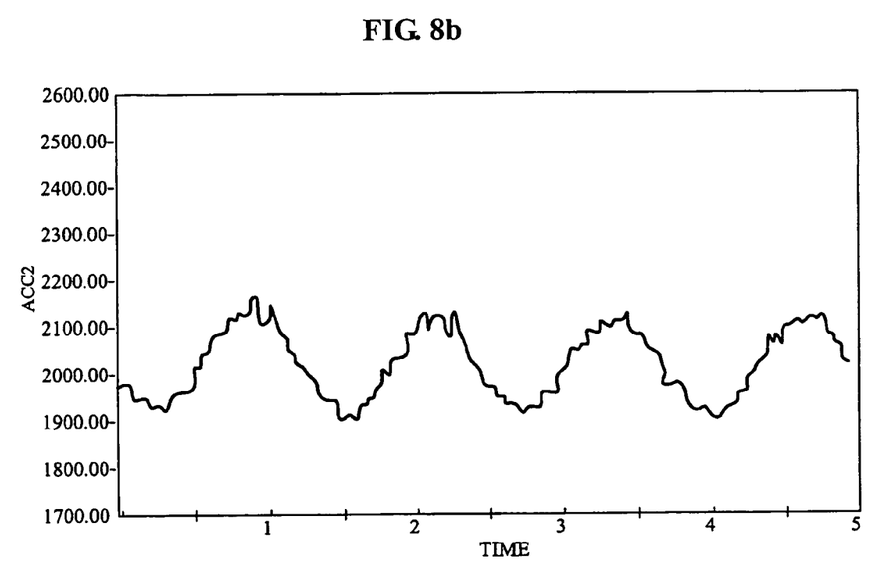
FIG. 8b is a diagram illustrating waveforms of outputs of a second motion detector of FIG. 7.

FIGS. 8a and 8b illustrate waveforms of an output of the first motion detector 750 ACC1 and an output of the second motion detector 760 ACC2 as A/D converted values with respect to time.

In a rotation state by the system 700 in FIG. 7, an output of the first motion detector 750 ACC1 and an output of the second motion detector 760 ACC2 significantly fluctuate around 0.0 g, for example, A/D converted value 2048. The output of the second motion detector 760 ACC2 is 180 degrees phase inverted in comparison with the output of the first motion detector 750 ACC1. This is because acceleration vectors of both ends of the rotation bar 730 direct opposite directions to each other.

When the first motion detector 750 is constantly supplied with power and operates, the first motion detector 750 generates a digital acceleration value ACC1 as a certain reference value. To make a digital acceleration value ACC2 of the second motion detector 760 similar to the digital acceleration value ACC1 of the first motion detector, a level of an output of the second motion detector 760 ACC2 in a rotation state is tested.

Even in the rotation state, the degree of fluctuation of the output of the second motion detector 760 ACC2 may be different according to a sampling and A/D conversion period, such as a period between T2 and T4 shown in FIG. 3. In this instance, the sampling and A/D conversion period is another part of the pulse width of the PCS. For example, when a sufficient period between T2 and T4 for sampling and A/D conversion of the controller 130 of FIG. 1 is secured starting from T2, an output of the second motion detector 760 ACC2 may be shown to be almost as same as the first motion detector 750. In this case, T2 is a normal operation point in time when the three-dimensional inertia sensor 120 included in the second motion detector 760 is stabilized for a long enough time.

Figure 9:
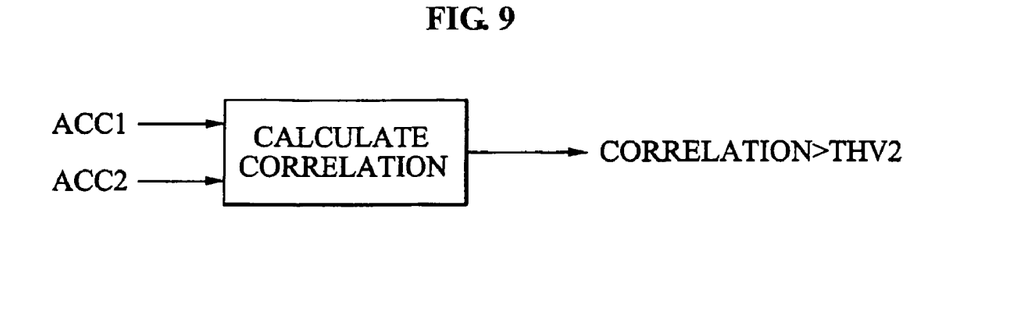
FIG. 9 is a diagram explaining a method of determining a sampling and an analog-to-digital (A/D) conversion period of a controller in a motion state by a system of FIG. 7.

As illustrated in FIG. 9, a correlation between an output of the first motion detector 750 ACC1 and an output of the second motion detector 760 ACC2 is calculated to determine a period between T2 and T4 for sampling and A/D conversion of the controller 130 of FIG. 1 in the rotation state as described above. A correlation value shows the strength of relationship between two values of a plurality of compared values. The correlation value may be calculated by a method of calculating a correlation coefficient. As is known, a correlation coefficient is calculated based on the mean of values obtained by respectively multiplying two values of a plurality of compared values, or the mean of values obtained by respectively multiplying two difference values between said each value and corresponding mean. Also, the mean of difference values between two values of a plurality of compared values may be calculated as a correlation coefficient.

As an example, the sampling and A/D conversion period, a period between T2 and T4, is determined to make a correlation value between an output of the first motion detector 750 ACC1 and an output of the second motion detector 760 ACC2 measured for a certain period larger than a threshold value THV2. It is difficult to make an output of the first motion detector 750 ACC1 and an output of the second motion detector 760 ACC2 to be 100% the same. Accordingly, the threshold value THV2 may be set as a value indicating 98% correlation between the digital acceleration values, ACC1 and ACC2.

Figure 10:
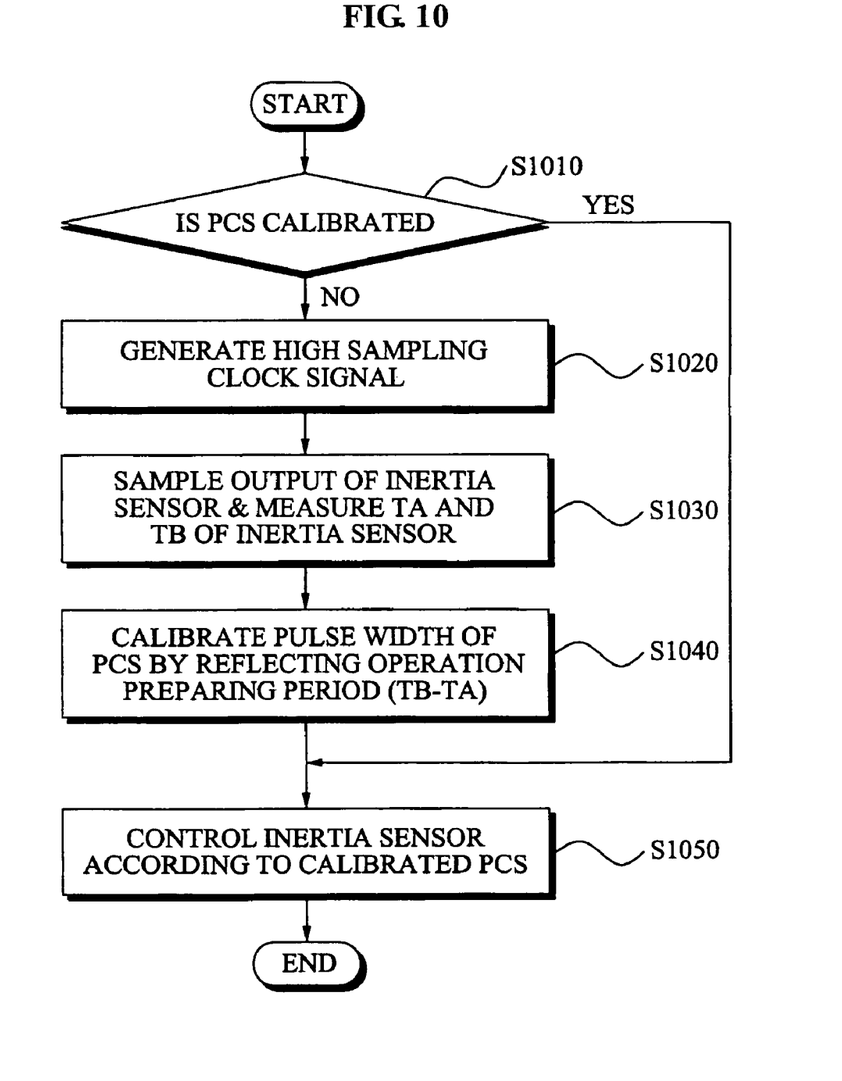
FIG. 10 is a flowchart illustrating initial calibration procedures of a power control signal according to an embodiment of the present invention.

FIG. 10 is a flowchart illustrating procedures of automatically calibrating the PCS for initial power supply. In this instance, it will be described how an initial operation preparing period PT of the three-dimensional inertia sensor 120 is automatically measured by the controller 130 and reflected to determine the pulse width of the PCS, as illustrated in FIG. 11.

Figure 11:
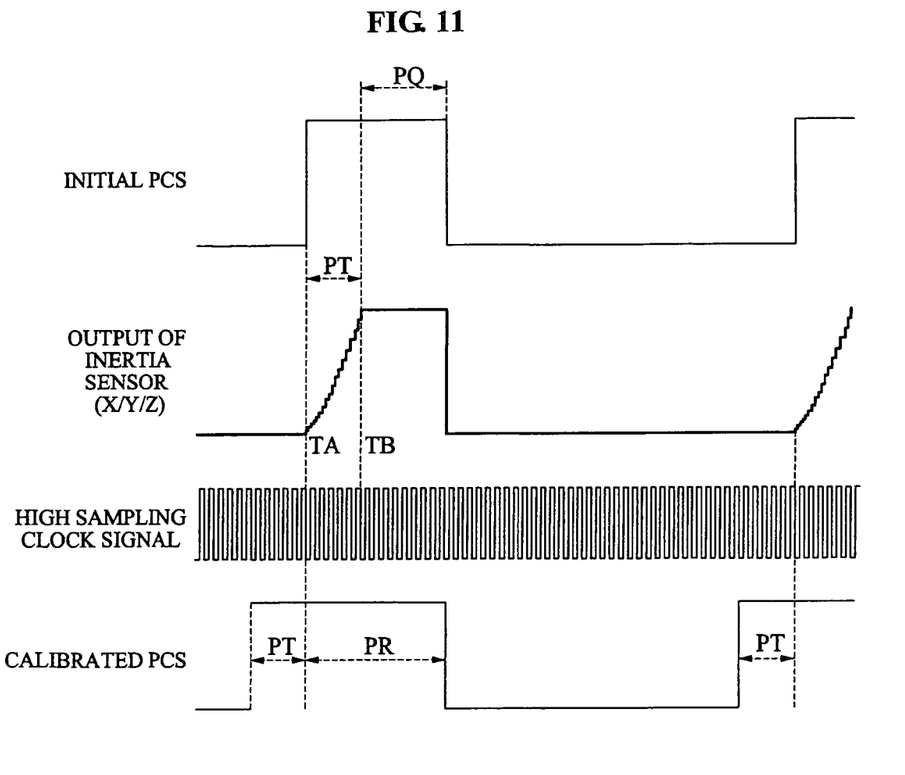
FIG. 11 is a diagram explaining the power control signal calibration according to FIG. 10.

Referring to FIGS. 1, 10, and 11, in S1010, the controller 130 determines whether the PCS is calibrated for initial power supply. In this instance, when the PCS is not calibrated, the controller 130 operates a predetermined high frequency oscillator (not illustrated) to generate a high sampling clock signal illustrated in FIG. 11, in S1020. The high sampling clock signal may have a higher frequency, such as 20 MHz, than a frequency that the controller 130 samples an output in a normal operation of the three-dimensional inertia sensor 120 for A/D conversion, such as 100 kHz.

In S1030, the controller 130 counts the clock pulses of the generated high sampling clock signal while sampling analog signal X, Y, or Z of the three-dimensional inertia sensor 120. Also, the controller 130 measures an operation starting time TA of the three-dimensional inertia sensor 120 and a normal operation time TB thereof. The operation starting time TA of the three-dimensional inertia sensor 120 corresponds to a point in time when power is supplied to the three-dimensional inertia sensor 120 according to the PCS.

Also, the normal operation time TB may be measured from a digital value that the controller 130 has generated by performing A/D conversion with respect to the sampled signal. As described above, the three-dimensional inertia sensor 120 may be an accelerator, a gyro sensor, a geomagnetic compass sensor, or the like. Also, the three-dimensional inertia sensor 120 may generate analog signal X, Y, or Z indicating acceleration associated with inertia of an object, angular velocity, yaw angle, and the like. In this case, the controller 130 may sample an analog acceleration signal from the accelerometer working as the three-dimensional inertia sensor 120 and determine the normal operation time TB. Generally, an A/D converted value obtained by sampling the analog acceleration signal in the normal operation time TB has a certain offset value that abruptly increases more than in the operation starting time TA of the three-dimensional inertia sensor 120. Accordingly, the controller 130 may determine the point in this time as the normal operation time TB.

When the operation starting time TA and the normal operation time TB of the three-dimensional inertia sensor 120 is measured, the controller 130 reflects the operation preparing period (PT=TB−TA) of the three-dimensional inertia sensor 120 and calibrates the pulse width of the PCS in S1040. Also, the difference between the operation starting time TA and the normal operation time TB is measured several times and the mean of the measured values may be used as the operation preparing period (PT=TB−TA)

For example, when period PQ that the operation preparing period (PT=TB−TA), for example, 0.5 ms, is subtracted from the initial pulse width of the PCS, for example, 1 ms, is shorter than period PR capable of sampling the analog signal of the three-dimensional inertia sensor 120 and converting the same into a digital value, for example, 1 ms, the controller 130 calibrates the initial pulse width of the PCS, for example, 1 ms and generates a calibrated PCS. As illustrated in FIG. 11, the calibrated PCS has the pulse width as wide as a period, in this example, 1.5 ms, in which the operation preparing period PT, as shown above for this example as 0.5 ms is added to the period PR of sampling the analog output signal of the three-dimensional inertia sensor 120 and converting the same into a digital value, in this example, 1 ms.

Accordingly, in S1050, the controller 130 controls the three-dimensional inertia sensor 120 according to the calibrated PCS and reduces the power consumption of the three-dimensional inertia sensor 120. Also, the controller generates a certain digital value associated with inertia, such as acceleration value ACC, according to motion of a device including the motion detector 100.

As described above, in the motion detector 100 according to the present embodiment, power is supplied to operate the three-dimensional inertia sensor 120 or shut off according to the PCS. Also, while the three-dimensional inertia sensor 120 is supplied with power, three-dimensional analog acceleration signals X, Y, and Z are generated, sampled, A/D converted, and outputted via the controller 130. The pulse width of the PCS is determined by reflecting the sampling and A/D conversion period PR and reflecting the operation preparing period PT of the three-dimensional inertia sensor 120 from the converted digital value.

The motion detecting method according to the above-described embodiments of the present invention may be recorded in computer readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, etc. including a carrier wave transmitting signals specifying the program instructions, data structures, etc. Examples of program instructions include both machine code, such as produced by a compiler, and files containing higher level code that may be executed by the computer using an interpreter. The described hardware devices may be configured to act as one or more software modules in order to perform the operations of the present invention.

According to the above-described embodiments of the present invention, in a motion detector, power is not constantly supplied to an inertia sensor and the minimal amount of power which is necessary for the operation of the inertia sensor is supplied according to a power control signal in the form of a pulse. Accordingly, it is possible to reduce the power consumption in the inertia sensor.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A motion detector comprising:
an inertia sensor supplied with power and generating an analog signal associated with inertia, the power selectively supplied or shut off according to a power control signal; and
a controller generating the power control signal, sampling the analog signal associated with inertia, and converting the analog signal into a digital value, wherein power to the inertia sensor is shut off within a defined period upon completion of the sampling of the analog signal, according to the power control signal,
wherein a pulse width of the power control signal is determined by reflecting a sampling and digital conversion period and reflecting an operation preparing period of the inertia sensor based on the converted digital value.

2. The motion detector of claim 1, wherein:
the analog signal associated with inertia is an analog acceleration signal,
the controller samples the analog acceleration signal and converts the analog acceleration signal into a corresponding digital acceleration value within a pulse of the power control signal for which power is supplied to the inertia sensor, and
the pulse width of the power control signal is determined on the basis of digital acceleration values in a motion state and digital acceleration values in a static state where the analog acceleration signal is converted by the controller.

3. The motion detector of claim 1, wherein the sampling of the analog acceleration signal and power shut off to the inertia sensor is performed substantially at the same time.

4. The motion detector of claim 2, wherein the pulse width of the power control signal is determined on the basis of digital acceleration values in a static state and in a motion state from another motion detector constantly supplied with power, in addition to the digital acceleration values in the static state and in the motion state from the motion detector selectively operating according to the power control signal.

5. The motion detector of claim 4, wherein a difference between a maximum peak-to-peak level of digital acceleration values of the motion detector and a maximum peak-to-peak level of digital acceleration values of the another motion detector measured for a certain period in the static state is less than a threshold value.

6. The motion detector of claim 5, wherein the threshold value is less than 0.05 g, g being an acceleration of gravity.

7. The motion detector of claim 4, wherein a correlation between digital acceleration values of the motion detector and digital acceleration values of the another motion detector measured for a certain period in the motion state is greater than a threshold value.

8. The motion detector of claim 7, wherein the motion state is a state where the motion detector and the another motion detector two-dimensionally rotate about one rotation axis.

9. The motion detector of claim 8, wherein the correlation is calculated using 180 degrees phase inverted values of digital acceleration values from the another motion detector.

10. The motion detector of claim 9, wherein the threshold value is greater than a value corresponding to 98% correlation of the digital acceleration values.

11. The motion detector of claim 1, wherein the controller operates in a standby mode for a certain period before the inertia sensor is supplied with power after the converted digital value is generated.

12. The motion detector of claim 1, wherein the inertia sensor is a gyro sensor, a geomagnetic compass sensor, or an accelerometer generating three-dimensional analog signals.

13. The motion detector of claim 12, wherein the controller generates a corresponding digital value indicating a degree of motion on the basis of the three-dimensional analog signals.

14. The motion detector of claim 1, wherein the controller measures a difference between an operation starting time of the inertia sensor when power is initially supplied according to the power control signal and a normal operation time of the inertia sensor, as the operation preparing period, and reflects the measured difference to determine the pulse width of the power control signal.

15. The motion detector of claim 14, wherein the controller determines the pulse width to be at least as long as the operation preparing period and the sampling and digital conversion period added together.

16. The motion detector of claim 14, wherein the controller measures a time when the digital value has a certain offset value greater than in the operation starting time of the inertia sensor, as the normal operation time of the inertia sensor.

17. A method of detecting motion by using an inertia sensor, the method comprising:
generating a power control signal;
selectively supplying or shutting off power to the inertia sensor according to the power control signal;
generating an analog signal associated with inertia via the inertia sensor; and
sampling the analog signal and converting the same into a digital value, wherein power to the inertia sensor is shut off within a defined period upon completion of the sampling of the analog signal, according to the power control signal,
wherein a pulse width of the power control signal is determined by reflecting a sampling and digital conversion period and reflecting an operation preparing period of the inertia sensor based on the converted digital value.

18. The method of claim 17, wherein the conversion comprises sampling an analog acceleration signal as the analog signal associated with inertia and converting the sampled analog acceleration signal into a corresponding digital acceleration value within a pulse width of the power control signal for which the power is supplied to the inertia sensor, and
wherein the pulse width of the power control signal is determined on the basis of digital acceleration values in a static state and digital acceleration values in a motion state.

19. The method of claim 17, wherein the sampling of the analog acceleration signal and the power shut off to the inertia sensor is performed substantially at the same time.

20. The method of claim 18, wherein the pulse width of the power control signal is determined on the basis of digital acceleration values corresponding to analog acceleration signals in a static state and in a motion state from an another inertia sensor constantly supplied with power, in addition to the digital acceleration values corresponding to analog acceleration signals in the static state and in the motion state from the inertia sensor selectively operating according to the power control signal.

21. The method of claim 20, wherein the difference between the maximum peak-to-peak level of corresponding digital acceleration values into which outputs of the inertia sensor are converted and the maximum peak-to-peak level of corresponding digital acceleration values into which outputs of the another inertia sensor are converted, measured, for a certain period in the static state is less than a threshold value.

22. The method of claim 21, wherein the threshold value is smaller than 0.05 g, g being an acceleration of gravity.

23. The method of claim 20, wherein a correlation between corresponding digital acceleration values into which an output of the inertia sensor is converted and corresponding digital acceleration values in which an output of the another inertia sensor is converted, measured for a certain period in the motion state is greater than a threshold value.

24. The method of claim 23, wherein the motion state is a state where the inertia sensor and the another inertia sensor two-dimensionally rotate about one rotation axis.

25. The method of claim 24, wherein the correlation is calculated using 180 degrees phase inverted values of the corresponding digital acceleration values into which an output of the another inertia sensor is converted.

26. The method of claim 25, wherein the threshold value is greater than a value corresponding to 98% correlation of the digital acceleration values.

27. The method of claim 17, wherein the inertia sensor is a gyro sensor, a geomagnetic compass sensor, or an accelerometer generating three-dimensional analog signals.

28. The method of claim 17, comprising measuring a difference between an operation starting time of the inertia sensor when power is initially supplied according to the power control signal and a normal operation time of the inertia sensor as the operation preparing period, and reflecting the measured difference to determine the pulse width of the power control signal.

29. The method of claim 28, comprising determining the pulse width to be at least as long as the operation preparing period and the sampling and digital conversion period added together.

30. The method of claim 28, comprising measuring a time when the digital value has a certain offset value greater than in the operation starting time of the inertia sensor as the normal operation time of the inertia sensor.

31. A computer-readable storage medium encoded with processing instructions for causing a processor to execute a method of detecting motion by using an inertia sensor, the method comprising:
generating a power control signal;
selectively supplying or shutting off power to the inertia sensor according to the power control signal;
generating an analog signal associated with inertia via the inertia sensor; and
sampling the analog signal and converting the same into a digital value, wherein power to the inertia sensor is shut off within a defined period upon completion of the sampling of the analog signal, according to the power control signal,
wherein a pulse width of the power control signal is determined by reflecting a sampling and digital conversion period and reflecting an operation preparing period of the inertia sensor based on the converted digital value.

* * * * *